Feb. 12, 1935.  C. L. BUTLER  1,990,774
SEED POTATO CUTTER
Filed Aug. 26, 1932  4 Sheets-Sheet 1
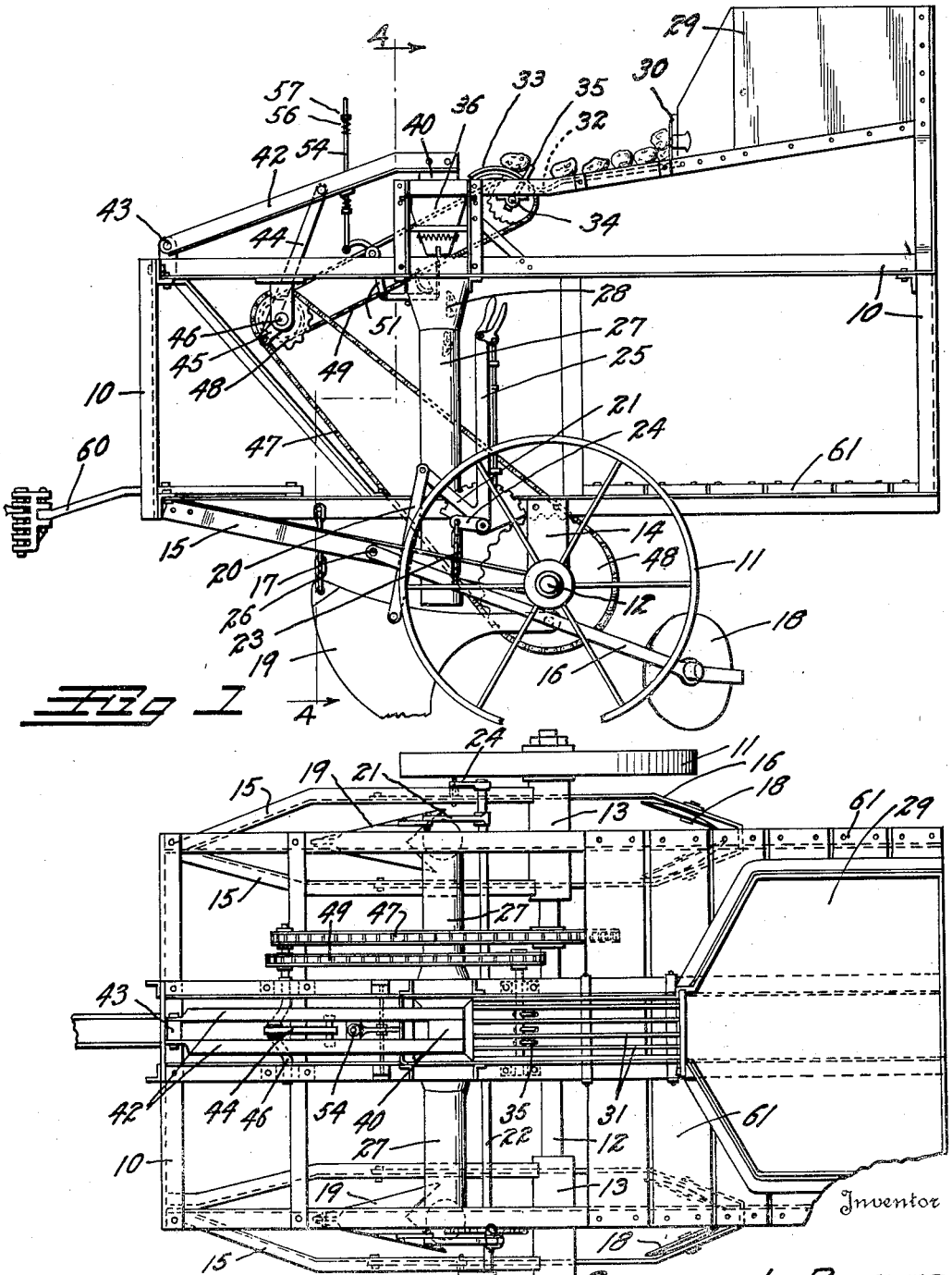

Feb. 12, 1935. C. L. BUTLER 1,990,774
SEED POTATO CUTTER
Filed Aug. 26, 1932 4 Sheets-Sheet 2
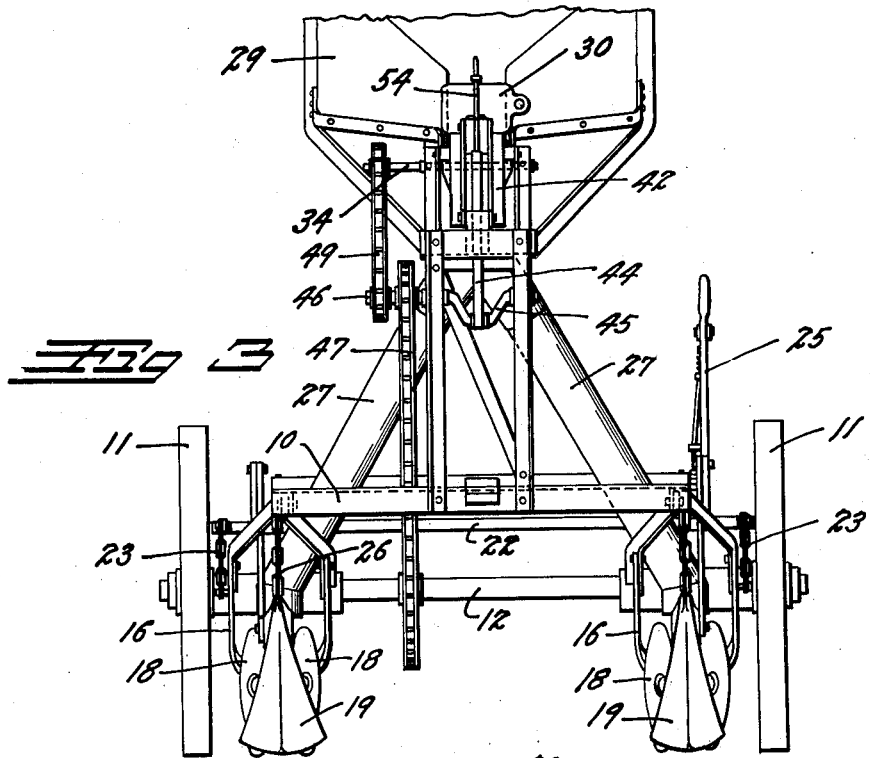
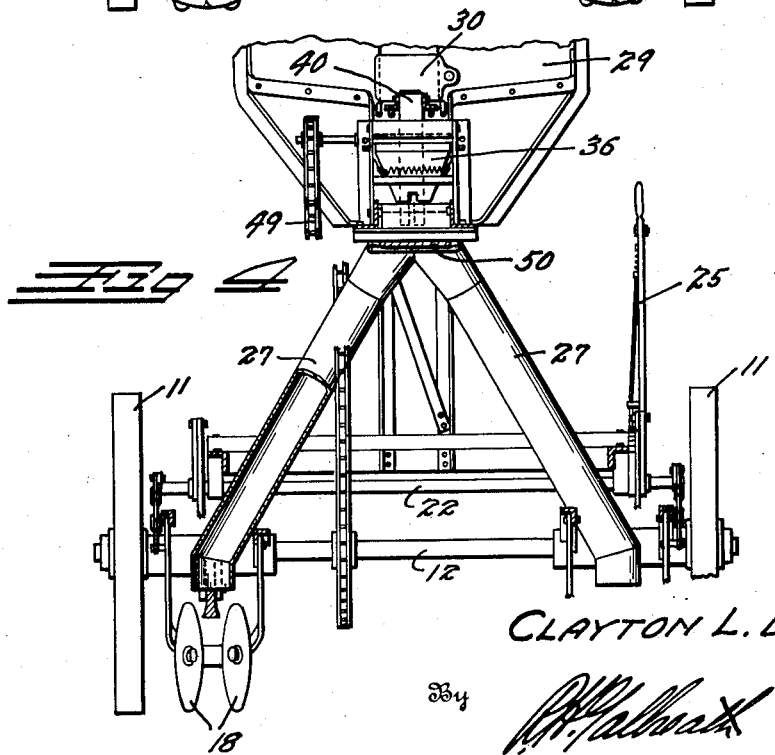
Inventor
CLAYTON L. BUTLER
By
Attorney

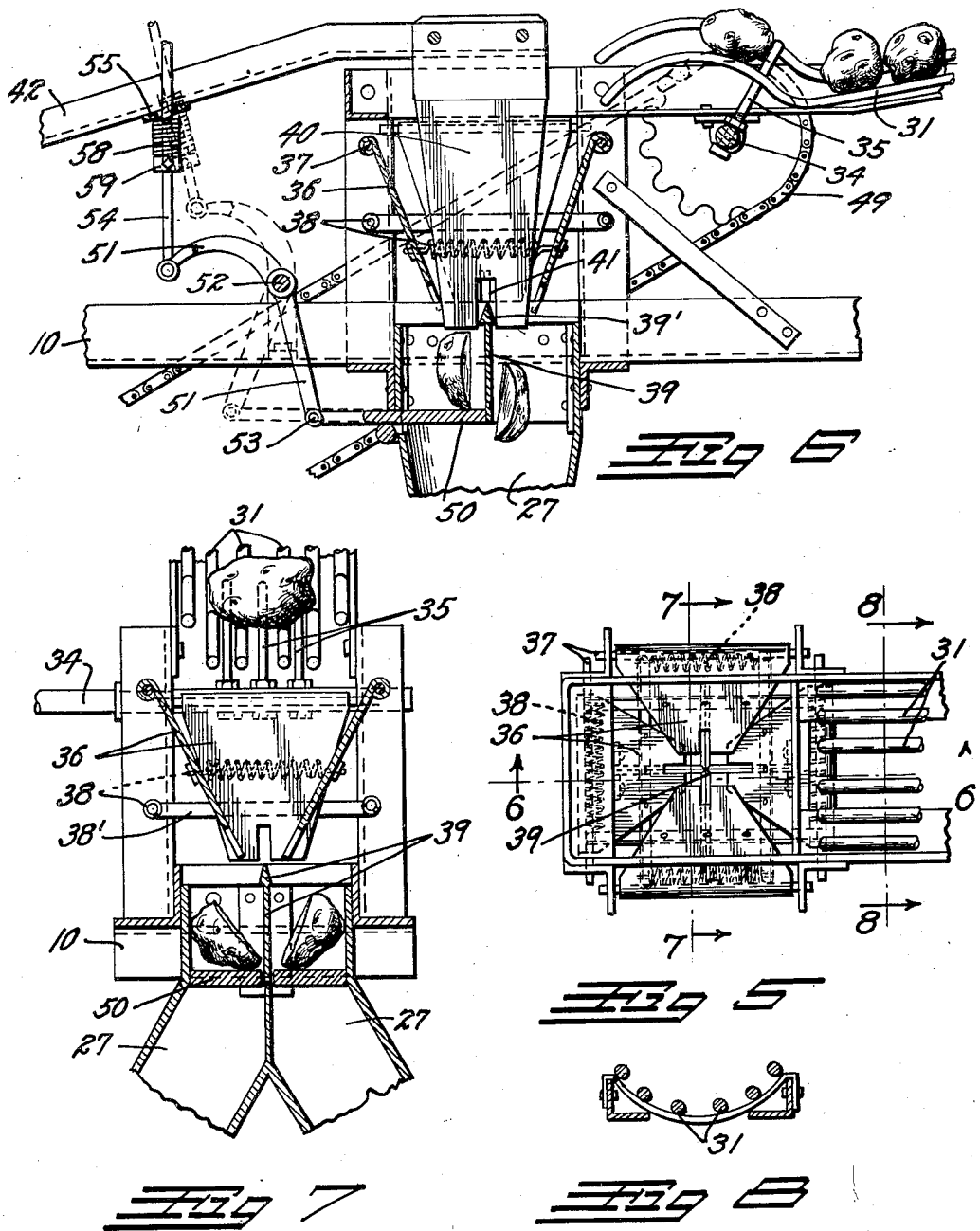

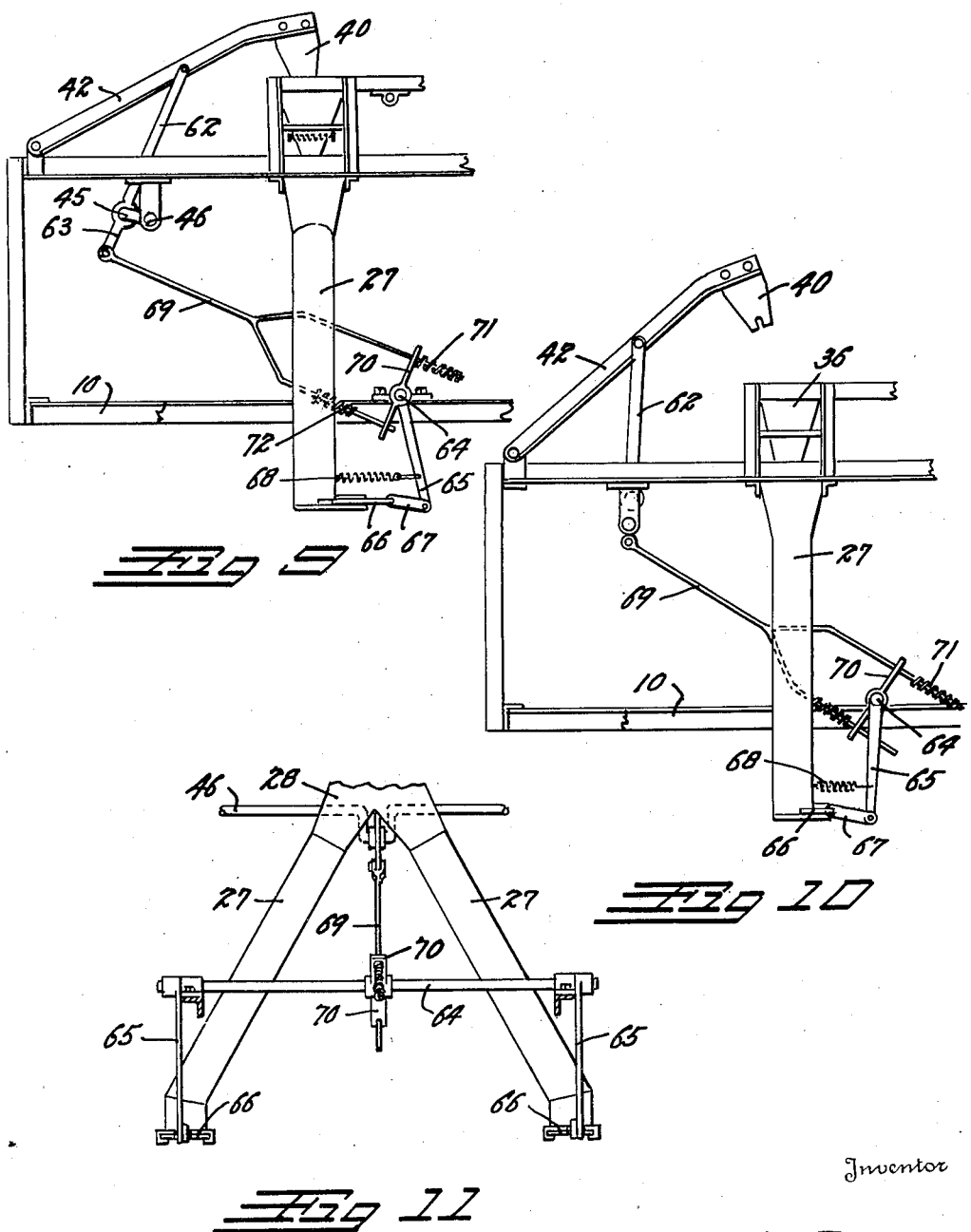

Patented Feb. 12, 1935

1,990,774

UNITED STATES PATENT OFFICE 1,990,774

SEED POTATO CUTTER

Clayton L. Butler, Pine Bluffs, Wyo.

Application August 26, 1932, Serial No. 630,512

8 Claims. (Cl. 146—59)

This invention relates to a potato cutting and planting machine, and has for its principal object the provision of a highly efficient mechanism which will cut potatoes into sections suitable for planting, and will then plant the cut sections, thus combining in a single machine an automatic seed potato cutter with an automatic seed potato planter.

Another object of the invention is to provide a seed potato cutter which will automatically feed itself and which will properly align each individual potato with the cutting knives regardless of its size.

Still another object is to provide a cutter which will require but a minimum of power, and which will handle a relatively large number of potatoes in a given time.

A further object is to provide a feeding device which will feed the potatoes to the cutter one at a time.

A still further object is to provide a feed mechanism for the planter which will plant two rows of hills and which will uniformly distribute the cut parts along the rows.

A still further object is to so construct the cutting knives that the moist, cut, potato sections will not adhere thereto.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the improved combined seed potato cutter and planter.

Fig. 2 is a plan view thereof.

Fig. 3 is a front elevation thereof.

Fig. 4 is a vertical cross section taken on the line 4—4, Fig. 1. In this view, one of the feed chutes has been cut open to show the interior thereof.

Fig. 5 is a plan view of the cutting hopper.

Fig. 6 is a detail enlarged section through the cutting hopper taken on the line 6—6, Fig. 5.

Fig. 7 is a cross section through the cutting hopper taken on the line 7—7, Fig. 5.

Fig. 8 is a detail section through the feed chute taken on the line 8—8, Fig. 5.

Figs. 9, 10 and 11 are diagrammatic views illustrating the action of an alternate form of said dropping device.

The invention comprises a structural framework 10 mounted upon a pair of supporting wheels 11. The wheels 11 are carried on the extremities of an axle 12. Either one or both of the wheels 11 are keyed to the axle so that it must rotate therewith. The axle 12 is carried in suitable bearings 13 upon which the frame 10 is supported by means of vertical standards 14 and angularly-positioned wheel braces 15. A disk frame 16 is hinged to each pair of angle braces 15, as shown at 17. Each disk frame carries a pair of furrow covering disks 18.

A furrow opening plow 19 is hinged to each disk frame 16. The forward extremities of the plows 19 are supported from connecting links 20 which are suspended from suitable plow levers 21 upon a lever shaft 22. The disk frames 16 are suspended by suitable chains 23 from a pair of disk levers 24 which also extend from the lever shaft 22. The lever shaft 22 may be rotated to any desired position by means of a hand lever 25.

It can be seen from the above, that if the hand lever 25 is swung rearwardly, it will act to lift both the plows 19 and both sets of disks 18 from the ground. The extent to which the plows 19 may be lowered is limited by suitable stop chains 26. Cut sections of seed potatoes are fed into the two furrows formed by the plows 19 through a pair of diverging feed tubes 27 which extend outwardly and downwardly from a junction 28 in the upper portion of the frame 10.

The mechanism for cutting the potatoes and feeding the cuts to the feed tubes 27 is constructed as follows: A potato receiving hopper 29 is mounted above the frame 10 and provided with a suitable discharge door 30. The potatoes discharge from the hopper 29 upon an inspection chute formed of a series of parallel bars 31. At the lower extremity of the chute, the bars 31 are bent to form a potato receiving pocket 32, into which, the lowermost potato of the stream falls. The bars are then arched upwardly and forwardly as shown at 33, terminating above a cutting hopper to be later described.

Under the forward portion 33 of the bars 31, a cross shaft 34 is journalled. This shaft carries a series of projecting feed pins 35 which, as the shaft rotates, swing upwardly and forwardly between the bars 31 to lift and deposit each potato individually in the cutting hopper.

The cutting hopper is formed with four hinged side plates 36, as illustrated in Fig. 5, with relatively narrow bottoms and with relatively wide tops. The tops are rolled about side hinge pins 37 so that they may swing thereon. The side plates 36, at opposite sides of the hopper, are constantly drawn toward each other by means of tension springs 38, which are stretched between the extremities of spring arms 38' secured to the backs of the side plates 36. Immediately below the side plates 36 are two crossed cutting knives 39. The side plates 36 are notched at their bottoms as illustrated to receive the knives.

As each potato falls into the cutting hopper, a plunger 40 descends and presses it downwardly into the hopper and past the knives 39 so as to cut it into four sections. The bottom of the plunger 40 contains a cross notch 41 which allows its lower face to pass below the upper edges of the knives 39. The plunger 40 is mounted upon the extremity of a plunger arm 42 which is hinged at 43 adjacent the forward extremity of the frame 10. The plunger is reciprocated up and down through the medium of a connecting rod 44 which connects the plunger arm 42 with a crank 45 on a crank shaft 46.

The crank shaft 46 is driven from the axle 12 through the medium of a drive chain 47 and suitable chain sprockets 48. The cross shaft 34 is driven from the crank shaft 46 through the medium of a similar chain 49. The respective relation of the rotation of the shafts 34 and 46 is such that the feed pins 35 will deposit a potato in the cutting hopper while the plunger 40 is lifted therefrom, and as the plunger descends, the pins will return to receive the next potato.

It will be noted that the hinged, spring-actuated side plates 36 of the cutting hopper always position each potato centrally over the intersection of the knives 39, regardless of the potato's size, and, as the potato is forced downwardly, these sides will swing uniformly outward so that each cut section will be equal in size to each other cut section.

The longitudinal knife 39 acts as a divisional partition between the two feed tubes 27 so that two quarters of the potato will fall into each tube. One of the quarters in each tube will drop immediately down the tube to the furrow formed by the plow 19. The other quarter in each tube will be prevented from dropping by a slide 50 which is periodically projected into the feed tubes immediately below the knives. When the entire machine reaches the next hill location, the slide 50 will be withdrawn to allow the remaining two quarters to drop, one down each feed tube to the furrows.

The withdrawing of the slide 50 is accomplished by means of a bell crank lever 51 which is mounted on a lever shaft 52 across the frame 10. The lower extremity of the lever 51 connects with the slide 50, as shown at 53. The upper extremity of the lever 51 is connected to a push rod 54 which extends through an ear 55 on the plunger arm 42. As the plunger arm 42 approaches the upper limit of its travel, the ear 55 will strike an upper limit spring 56 held upon the upper extremity of the slide rod 54 by means of an upper stop nut 57. This lifts the slide rod and actuates the lever 51 to withdraw the slide 50. As the plunger approaches the lower limit of its travel, the ear 55 will strike a lower limit spring 58, which is maintained upon the slide rod 54 by means of a lower stop nut 59. This depresses the push rod 54 and actuates the lever 51 and projects the slide 50 inwardly. Thus two quarters of the potato will be dropped when the plunger is at the lower limits of its travel and the remaining two quarters when it is at its upper limit of travel. This insures an evenly spaced planting throughout the length of the rows.

The frame 10 is provided with a suitable draw bar 60 by means of which it might be connected to a tractor or other pulling equipment. It is also provided with a platform 61 upon which an operator may stand to control the stream of potatoes issuing from the receiver 29 and to operate the hand lever 25.

It is desired to call particular attention to the construction of the cutting knives 39. It has been found that a single thin bladed knife is not satisfactory for this purpose, for the vacuum of the wet cut surfaces of the potato cause the quarters to stick to the knives so that they will not drop into the feed tubes. This difficulty was overcome by providing a relatively thick edge 39' upon the knives along the upper edge of the thin blade thereof, as shown in Figs. 6 and 7. This allows air to enter between the cut surfaces of the potato and the knife and prevents adherence of the former thereto.

In Figs. 9, 10, and 11, an alternate form of seed dropping mechanism is illustrated. This is designed to break the fall of the cut seed piece so that it will not strike the ground with sufficient force to roll out of place in the row. In this form of the device, the plunger arm 42 is actuated from a connecting rod 62 which has a projecting-below portion 63 which extends below the crank 45. A shaft 64 is journalled across the lower members of the frame work 10 and provided with slide operating levers 65 at its extremities.

Each of the feed tubes 27 is closed at its bottom by means of a slide 66. Each slide 66 is connected by means of a link 67 with one of the slide operating levers 65. A pair of tension springs 68 pull upon the levers 65 to normally maintain the slides 66 in the closed position. The slides are pulled to the open position by means of a mechanism connected with the projecting-below portion 63 of the connecting rod 62.

This mechanism comprises a forked rod 69, the tines of which pass through a perforated double lever 70 on the shaft 64. The upper tine is relatively long, as illustrated, and is provided with a compression spring 71 at its extremity. The lower tine is provided with a small compression spring 72 spaced from its extremity.

With this construction, the slides 66 will be opened each time the plunger arm 42 moves upwardly and each time it moves downwardly. For instance, assume the plunger arm 42 is rising in Fig. 9, as it reaches the halfway position the crank 45 will throw the extremity 63 of the connecting rod forwardly. This causes the spring 71 to strike the upper extremity of the double lever 70 and pull the slides open to drop the seed pieces which are then in the bottoms of the chutes. When the extreme position is reached by the plunger arm, neither of the springs 71 or 72 will contact with the double lever 70 so that the springs 68 will be free to close the slides as shown in Fig. 10. Now, as the plunger arm 42 descends, the crank 45 will reach its extreme rearward position. This will project the tines through the double lever 70 until the lower spring 72 contacts therewith. This will again actuate the shaft 64 to open the slides 66 to drop the remaining two seed portions. The slide 50 previously described is of course employed in connection with the mechanism of Figs. 9, 10, and 11, to release two seed portions at each extreme of movement of the plunger arm 42.

While only two seed tubes have been illustrated, it is, of course, understood that any desired number could be employed, and while a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. In a potato cutting and planting machine a cutting hopper; crossed knives in the bottom of said hopper; a plunger arm; a plunger secured to said arm so as to enter said hopper and press a potato past said cross knives so as to cut it into four pieces; a horizontal slide member below said knives to stop two of said four pieces; and means for withdrawing said slide in consequence of the movement of said plunger arm so as to allow the remaining two pieces to drop; tubes to receive said dropped pieces and convey them to the planting rows; additional slide members in said tubes; a connection between said plunger arm and said additional slide members so as to operate the latter in consequence of the movement of said plunger.

2. A potato cutter comprising; a cutting hopper; crossed knives in the bottom of said hopper; means for feeding potatoes into said hopper; a plunger arm hinged at its one extremity adjacent said hopper; a plunger carried by the other extremity of said plunger arm so as to enter said hopper and force the potatoes past said knives; means for swinging said plunger arm so as to cause said plunger to pass into and out of said hopper; a slide positioned below said knives so as to stop certain parts of said potatoes; a lever operatively connected to said slide; and means for actuating said lever in consequence of the movement of said plunger arm so that said slide will be closed as said plunger moves downward and opened as said plunger moves upward.

3. A potato cutter comprising; a cutting hopper; crossed knives in the bottom of said hopper; means for feeding potatoes into said hopper; a plunger arm hinged at its one extremity adjacent said hopper; a plunger carried by the other extremity of said plunger arm so as to enter said hopper and force the potatoes past said knives; means for swinging said plunger arm so as to cause said plunger to pass into and out of said hopper; a slide positioned below said knives so as to stop certain parts of said potatoes; a lever operatively connected to said slide; and means for actuating said lever in consequence of the movement of said plunger arm so that said slide will be closed as said plunger moves downward and opened as said plunger moves upward; and means for allowing said plunger to continue downward after said slide has reached and stopped at the closed position.

4. In a potato cutter of the type having two stationary crossed knives for cutting the potato into four parts and means for separating said parts into pairs and delaying the delivery of one member of each pair comprising: four compartments separated from each other by said knives and receiving the potato parts from the latter; a first feed tube for receiving the parts from two of said compartments; a second feed tube for receiving the parts from the remaining two compartments; a slide member closing the bottom of one compartment in each pair; and means for withdrawing said slide after the parts have passed through the open compartments so that one part will be delivered to each tube at the time of cutting, and one part to each tube in the interval between cuts.

5. In a potato cutter of the type having two stationary crossed knives for cutting the potato into four parts and means for separating said parts into pairs and delaying the delivery of one member of each pair comprising: four compartments separated from each other by said knives and receiving the potato parts from the latter; a first feed tube for receiving the parts from two of said compartments; a second feed tube for receiving the parts from the remaining two compartments; a slide member closing the bottom of one compartment in each pair; and means for withdrawing said slide after the parts have passed through the open compartments so that one part will be delivered to each tube at the time of cutting, and one part to each tube in the interval between cuts, and means for releasing the pieces from said feed tubes.

6. In a potato cutting and planting machine, a cutting hopper; crossed knives in the bottom of said hopper; a plunger attached to press a potato past said crossed knives so as to cut it into four pieces; means for reciprocating said plunger; a slide attached to stop two of said four pieces; a lever for operating said slide, said lever being operatively connected with said plunger so as to operate in consequence of the reciprocation of the latter to withdraw said slide at pre-determined times to allow the remaining two pieces to drop; two tubes each to receive two of said dropped pieces and to convey them to the planting rows; means for stopping each individual piece in said tubes; and means for releasing said plant stopping means at pre-determined times.

7. In a potato cutter device having hopper sides guiding the potatoes to a crossed knife, means for pressing said potatoes against said knife comprising: a plunger arm hinged at its one extremity with its other extremity positioned above said hopper sides; a plunger secured to said other extremity of said arm; a lateral shaft below said arm; a crank on said shaft; a connecting rod extending between said crank and said arm so that as said shaft rotates said arm will swing upon its hinge to cause said plunger to force potatoes from between said sides and against said knife; a slide extending partially under said crossed knife so as to stop certain of the cut pieces; a rocking lever operatively connected with said slide at its one extremity; and a push rod connected with the other extremity of said lever, said push rod being positioned so as to be actuated by said plunger arm as the latter approaches the bottom of its stroke so as to close said slide as the plunger moves downwardly and open said slide as the plunger moves upward.

8. In a potato cutting device having hopper sides guiding the potatoes to a crossed knife, means for pressing said potatoes against said knife comprising: a plunger arm hinged at its one extremity with its other extremity positioned above said hopper sides; a plunger secured to said other extremity of said arm; a lateral shaft below said arm; a crank on said shaft; and a connecting rod extending between said crank and said arm so that as said shaft rotates said arm will swing upon its hinge to cause said plunger to force potatoes from between said sides and against said knife; a slide extending partially under said crossed knife so as to stop certain of the cut pieces; a rocking lever operatively connected with said slide at its one extremity; a push rod connected with the other extremity of said lever, said push rod being positioned so as to be actuated by said plunger arm as the latter approaches the bottom of its stroke so as to close said slide as the plunger moves downward and open said slide as the plunger moves upward; a tube extending downward at each side of said knife so as to receive the pieces from that side; a second slide in each tube; levers for operating said second slide; and means for correcting said latter levers with said plunger arm so that they also will operate in synchronism with said plunger arm.

CLAYTON L. BUTLER.